United States Patent
Keller et al.

(10) Patent No.: US 9,535,415 B2
(45) Date of Patent: Jan. 3, 2017

(54) SOFTWARE, SYSTEMS, AND METHODS FOR MOBILE VISUALIZATION OF INDUSTRIAL AUTOMATION ENVIRONMENTS

(75) Inventors: Michael Keller, Menomonee Falls, WI (US); Kelly Huttelmaier, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 691 days.

(21) Appl. No.: 13/533,133

(22) Filed: Jun. 26, 2012

(65) Prior Publication Data
US 2013/0024542 A1 Jan. 24, 2013

Related U.S. Application Data

(60) Provisional application No. 61/509,848, filed on Jul. 20, 2011.

(51) Int. Cl.
*G06F 15/16* (2006.01)
*G05B 19/042* (2006.01)

(52) U.S. Cl.
CPC . *G05B 19/0428* (2013.01); *G05B 2219/24041* (2013.01); *G05B 2219/31467* (2013.01); *G05B 2219/36159* (2013.01)

(58) Field of Classification Search
CPC .............. H04L 29/08072; G05B 2219/24048
USPC ....................................................... 709/208
See application file for complete search history.

(56) References Cited

U.S. PATENT DOCUMENTS

| | | | | |
|---|---|---|---|---|
| 6,268,853 | B1 * | 7/2001 | Hoskins ................ | G05B 15/02 700/83 |
| 6,697,681 | B1 * | 2/2004 | Stoddard et al. .............. | 700/17 |
| 6,717,382 | B2 * | 4/2004 | Graiger ................ | H04B 5/0043 318/568.11 |
| 7,043,311 | B2 * | 5/2006 | Nixon et al. .................... | 700/83 |
| 7,043,316 | B2 * | 5/2006 | Farchmin ........... | G05B 19/4188 700/95 |
| 7,082,528 | B2 * | 7/2006 | Zaudtke .............. | G06F 11/0709 235/462.15 |
| 7,085,623 | B2 * | 8/2006 | Siegers .............. | G05B 19/4184 318/568.11 |
| 7,116,229 | B1 * | 10/2006 | Miramontes ........... | H04B 1/202 340/10.51 |
| 7,143,149 | B2 * | 11/2006 | Oberg ..................... | H04W 4/02 455/426.2 |
| 7,208,900 | B2 * | 4/2007 | Carlson .................... | B25J 13/02 318/567 |
| 7,298,275 | B2 * | 11/2007 | Brandt ............... | G05B 19/4183 340/573.1 |
| 7,644,295 | B1 * | 1/2010 | Dotson ................... | G06F 1/263 700/12 |
| 7,657,329 | B1 * | 2/2010 | Lloyd ................ | G05B 19/056 700/17 |

(Continued)

*Primary Examiner* — Kevin Bates
*Assistant Examiner* — Clarence McCray

(57) ABSTRACT

Systems, methods, and software for operating a mobile device to control industrial automation equipment are provided herein. In a first example, a mobile device application comprising program instructions executable by a mobile device is provided. When executed by the mobile device, the program instructions direct the mobile device to obtain industrial device information corresponding to an industrial device within an automation environment, and display the industrial device information on a display of the mobile device.

10 Claims, 5 Drawing Sheets

(56) References Cited

U.S. PATENT DOCUMENTS

| | | | | |
|---|---|---|---|---|
| 7,706,136 B1* | 4/2010 | Dotson | H05K 5/0278 | |
| | | | | 361/679.01 |
| 7,720,552 B1* | 5/2010 | Lloyd | G05B 19/106 | |
| | | | | 345/156 |
| 7,729,789 B2* | 6/2010 | Blevins et al. | | 700/83 |
| 7,762,470 B2* | 7/2010 | Finn | G06K 7/0004 | |
| | | | | 235/380 |
| 7,787,992 B2* | 8/2010 | Pretlove | G06F 3/011 | |
| | | | | 700/259 |
| 7,835,805 B2* | 11/2010 | Hood | G05B 19/0426 | |
| | | | | 700/20 |
| 7,928,735 B2* | 4/2011 | Huang et al. | | 324/426 |
| 7,962,659 B2* | 6/2011 | Mann | G06F 15/177 | |
| | | | | 710/12 |
| 8,050,782 B2* | 11/2011 | Fallman et al. | | 700/83 |
| 8,185,219 B2* | 5/2012 | Gilbert et al. | | 700/83 |
| 8,311,858 B2* | 11/2012 | Everett et al. | | 705/4 |
| 8,368,640 B2* | 2/2013 | Dardinski | G05B 15/02 | |
| | | | | 345/108 |
| 8,402,101 B2* | 3/2013 | Callaghan | | 709/206 |
| 8,463,964 B2* | 6/2013 | Kostadinov | G05B 19/042 | |
| | | | | 700/86 |
| 8,483,851 B2* | 7/2013 | Stummer | G05B 19/409 | |
| | | | | 700/17 |
| 9,000,885 B2* | 4/2015 | Amran | G05B 19/409 | |
| | | | | 340/3.1 |
| 9,397,836 B2* | 7/2016 | Nixon | H04L 9/32 | |
| 2002/0011923 A1* | 1/2002 | Cunningham et al. | | 340/310.01 |
| 2002/0072868 A1* | 6/2002 | Bartone | H02J 3/14 | |
| | | | | 702/62 |
| 2002/0083228 A1* | 6/2002 | Chiloyan | G06F 9/4411 | |
| | | | | 710/9 |
| 2002/0130834 A1* | 9/2002 | Madarasz et al. | | 345/156 |
| 2003/0061295 A1* | 3/2003 | Oberg et al. | | 709/208 |
| 2003/0084112 A1* | 5/2003 | Curray | H04L 29/06 | |
| | | | | 709/208 |
| 2003/0115293 A1* | 6/2003 | Fogg | G06F 17/30876 | |
| | | | | 709/219 |
| 2003/0216971 A1* | 11/2003 | Sick et al. | | 705/26 |
| 2003/0217054 A1* | 11/2003 | Bachman et al. | | 707/4 |
| 2005/0226192 A1* | 10/2005 | Red | H04L 12/2803 | |
| | | | | 370/338 |
| 2006/0095855 A1* | 5/2006 | Britt | G05B 19/042 | |
| | | | | 715/760 |
| 2006/0178760 A1* | 8/2006 | Mann | G06F 8/38 | |
| | | | | 700/27 |
| 2006/0195832 A1* | 8/2006 | Chandley | G06F 8/36 | |
| | | | | 717/168 |
| 2006/0208673 A1* | 9/2006 | Kling | G01P 1/122 | |
| | | | | 318/66 |
| 2006/0241792 A1* | 10/2006 | Pretlove et al. | | 700/83 |
| 2006/0271618 A1* | 11/2006 | Kokubo et al. | | 709/202 |
| 2007/0005266 A1* | 1/2007 | Blevins et al. | | 702/22 |
| 2007/0078536 A1* | 4/2007 | Gordon | G05B 19/409 | |
| | | | | 700/83 |
| 2007/0078658 A1* | 4/2007 | Virji | G10L 15/26 | |
| | | | | 704/275 |
| 2007/0090922 A1* | 4/2007 | Weingarth | G05B 19/0425 | |
| | | | | 340/5.74 |
| 2007/0093921 A1* | 4/2007 | Braun | G05B 19/4185 | |
| | | | | 700/83 |
| 2007/0093926 A1* | 4/2007 | D. Braun | G05B 19/042 | |
| | | | | 700/112 |
| 2007/0139210 A1* | 6/2007 | Vicente | H02B 15/00 | |
| | | | | 340/639 |
| 2007/0144779 A1* | 6/2007 | Vicente | H05B 37/0254 | |
| | | | | 174/520 |
| 2007/0182576 A1* | 8/2007 | Proska et al. | | 340/636.1 |
| 2007/0240052 A1* | 10/2007 | Sherrill | G06F 3/048 | |
| | | | | 715/700 |
| 2008/0024939 A1* | 1/2008 | Cooper | H04L 12/10 | |
| | | | | 361/1 |
| 2008/0189246 A1* | 8/2008 | Lloyd | G06F 9/4443 | |
| 2009/0027056 A1* | 1/2009 | Huang et al. | | 324/439 |
| 2010/0188410 A1* | 7/2010 | Gilbert et al. | | 345/473 |
| 2010/0256785 A1* | 10/2010 | Lloyd | G05B 19/056 | |
| | | | | 700/83 |
| 2011/0029102 A1* | 2/2011 | Campney et al. | | 700/83 |
| 2013/0120462 A1* | 5/2013 | Shuler | G06F 3/1423 | |
| | | | | 345/660 |
| 2013/0278631 A1* | 10/2013 | Border et al. | | 345/633 |
| 2014/0058567 A1* | 2/2014 | Matsuoka et al. | | 700/276 |
| 2014/0096108 A1* | 4/2014 | Austin | | 717/113 |
| 2014/0161028 A1* | 6/2014 | Maria | | 370/328 |

* cited by examiner

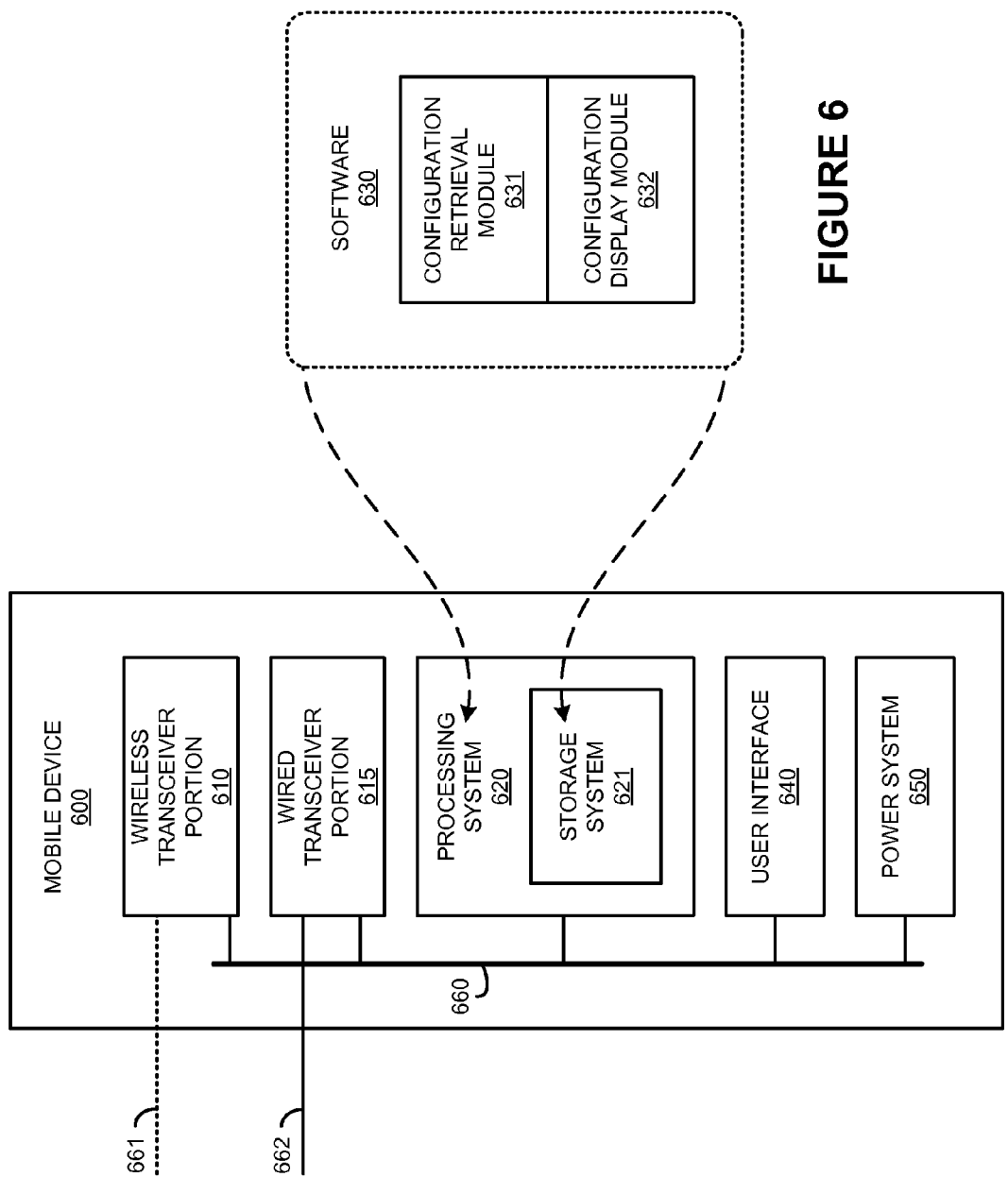

SOFTWARE, SYSTEMS, AND METHODS FOR MOBILE VISUALIZATION OF INDUSTRIAL AUTOMATION ENVIRONMENTS

RELATED APPLICATIONS

This application claims priority to and incorporates by reference U.S. Provisional Application No. 61/509,848, entitled SOFTWARE, SYSTEMS, AND METHODS FOR MOBILE VISUALIZATION OF INDUSTRIAL AUTOMATION ENVIRONMENTS, filed on Jul. 20, 2011.

TECHNICAL FIELD

The invention is related to the field of visualization of industrial automation environments, and in particular, to software, systems, and methods for mobile visualization for the purposes of configuration, monitoring, diagnostics, and maintenance.

TECHNICAL BACKGROUND

Industrial automation environments can include various machine systems, industrial automation devices, and industrial processes, such as those found in factories, milling operations, manufacturing facilities, and the like. These machine systems and industrial automation devices typically include an operation or process implemented by a mechanical or electrical device. Specific examples of these devices and systems can include various functions of machinery associated with industrial automation including manufacturing equipment, assembly equipment, milling equipment, process equipment, and packaging equipment, or other machine systems.

Typically, these industrial devices are controlled by a human operator via a control system, such as a control panel including various human-machine interface elements. These human-machine interface elements can include switches, knobs, touch panels, displays, indicator lights, or other interface elements. Intelligent control systems can be used, such as microcontroller-based control panels. Control systems can be located remotely from the industrial devices, and communicate with industrial devices over communication links. In further examples, Rockwell Automation PanelView systems can be employed to control and visualize the operations of industrial devices.

OVERVIEW

Systems, methods, and software for operating a mobile device to visualize industrial automation equipment are provided herein. In a first example, a mobile application comprising program instructions executable by a mobile device is provided. When executed by the mobile device, the program instructions direct the mobile device to retrieve and execute the program instructions from a memory of the mobile device, where the mobile application was downloaded prior to execution from a mobile application store into the memory of the mobile device. When executed by the mobile device, the program instructions also direct the mobile device to establish a communication link with an industrial device within an automation environment, obtain industrial device information corresponding to the industrial device, process the industrial device information to generate a graphical view of the industrial device information, and display the graphical view of the industrial device information on a display of the mobile device.

In another example, a computer readable medium having stored thereon program instructions executable by a mobile device is provided. When executed by a mobile device the program instructions direct the mobile device to obtain industrial device information corresponding to an industrial device within an automation environment, and display the industrial device information on a display of the mobile device.

In another example, a method of operating a mobile device is provided. The method includes obtaining industrial device information corresponding to an industrial device within an automation environment, and displaying the industrial device information on a display of the mobile device.

In another example, a mobile application store to provide mobile applications for interaction with industrial automation environments is provided. The mobile application store includes one or more computer readable media having stored thereon at least one mobile application available for download to a mobile computing device over a communication network, where the mobile application comprises program instructions that, when executed by the mobile computing device, direct the mobile computing device to obtain industrial device information corresponding to an industrial device within an industrial automation environment and display the industrial device information on a display of the mobile device. The mobile application store also includes a server system configured to receive a request initiated by the mobile computing device to obtain the mobile application and responsively transfer the mobile application to the mobile computing device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 6 is a block diagram illustrating a mobile device.

DETAILED DESCRIPTION

Figure 1:
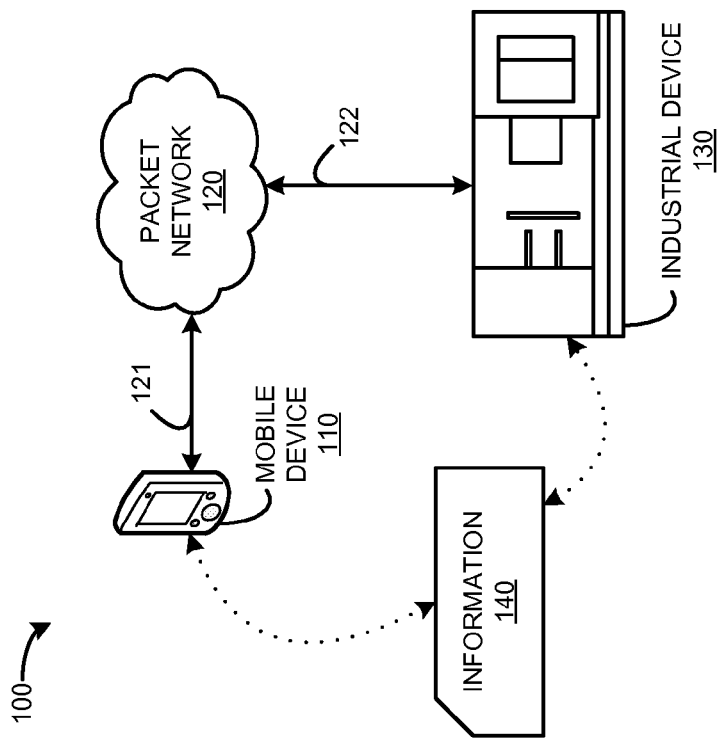
FIG. 1 is a system diagram illustrating an industrial automation environment.

FIG. 1 is a system diagram illustrating industrial automation environment 100. Industrial automation environment 100 includes mobile device 110, and packet network 120, industrial device 130. Mobile device 110 and packet network 120 communicate over packet link 121. Industrial device 130 and packet network 120 communicate over packet link 122.

Figure 2:
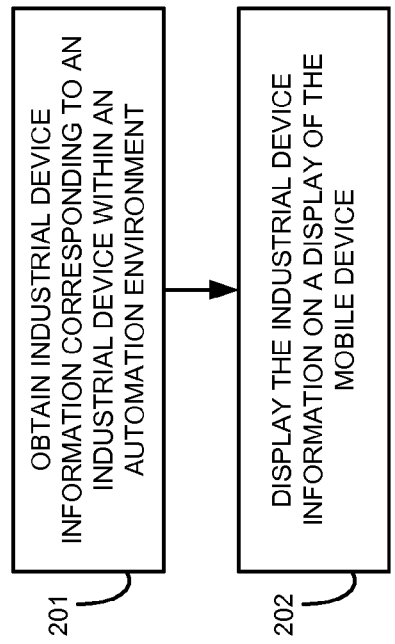
FIG. 2 is a flow diagram illustrating a method of operation of a mobile user device.

FIG. 2 is a flow diagram illustrating a method of operating mobile device 110. The operations of FIG. 2 are referenced herein parenthetically. Mobile device 110 obtains (201) configuration information 140 or other industrial device information associated with industrial device 130 within an automation environment 100, and displays (202) configuration information 140 or other industrial device information on a display of mobile device 110.

Mobile device 110 obtains configuration information or other industrial device information 140 over packet network 120 from industrial device 130 via packet links 121-122. It should be understood that packet network 120 can include further networks and systems. In some examples, a direct local connection is employed, such as Bluetooth or other personal area networks. Mobile device 110 can also be configured to update configuration information 140 so as to modify operation of industrial device 130. Configuration information 140 can be obtained by mobile device 110 over a wireless communication link associated with packet network 120. In one example, a computer readable medium can have stored thereon program instructions executable by mobile device 110 that, when executed by mobile device 110, direct mobile device 110 to operate as discussed herein. In a second example, a software product such as a mobile device application can have program instructions executable by mobile device 110 that, when executed by mobile device 110, direct mobile device 110 to operate as discussed herein.

Mobile device 110 comprises transceiver circuitry and communication elements. The transceiver circuitry typically includes amplifiers, filters, modulators, and signal processing circuitry. Mobile device 110 may also include user interface systems, memory devices, non-transitory computer-readable storage mediums, software, processing circuitry, or some other communication components. Mobile device 110 may be a wireless communication device, subscriber equipment, customer equipment, access terminal, smartphone, pad computing device, telephone, mobile wireless telephone, personal digital assistant (PDA), computer, e-book, mobile Internet appliance, wireless network interface card, media player, game console, or some other wireless communication apparatus, including combinations thereof. In some examples, mobile device 110 includes location determination circuitry or equipment, such as a GPS receiver, accelerometer, or other location determination circuitry or equipment.

Packet network 120 comprises packet communication and control systems for providing access to communication services for mobile devices. Packet network 120 can include a local area network, wireless local area network, wide area network, cellular voice and data network, an Ethernet network, or the Internet. In some examples, packet network 120 includes equipment to provide wireless access to communication services within different coverage areas to user devices, route communications between content providers and mobile devices, and receive and process registration and content requests, among other operations. Packet network 120 may also comprise routers, wireless routers, wireless access nodes, wireless access node controllers, base stations, Internet access nodes, telephony service nodes, wireless data access points, databases, or other communication and control equipment. Other networks can be employed, as well as multiple networks, including combinations thereof. In some examples, a direct local connection is employed, such as Bluetooth or other personal area networks.

Industrial device 130 can include an operation or process implemented by a mechanical or electrical device. Industrial device 130 includes a control system such as networking systems, processing systems, and computer-readable media for controlling the operations of industrial device 130. Industrial device 130 can include communication systems to communicate over IP, Ethernet, any industrial-based protocol, Ethernet/IP, or other network connectivity, including combinations thereof. In some examples, the control system and communication system are integrated into the same industrial device or industrial system. Examples of industrial device 130 include various functions of machinery associated with industrial automation including manufacturing equipment, assembly equipment, packaging equipment, milling equipment, presses, hydraulic equipment, industrial vehicles, vats, batch process equipment, tanks, fillers, sorters, scanning equipment, or other machine systems, including combinations thereof. Further examples of industrial device 130 include machine control systems, such as motor power controls, motor control centers, pump power controls, lathe machine speed controls, roller mechanism engagement systems, on/off functions of a manufacturing device, a lift function for a forklift, robotic arms, among other examples. Yet further examples of industrial device 130 include Rockwell Automation or other industrial automation and information products including operator interfaces, drives, motors, I/O modules, programmable controllers, circuit breakers, contactors, motor protectors, energy and power monitors, PowerFlex® drives, servo drives, servo motors, push buttons, signaling devices, relays, timers, switches, or safety devices.

Figure 3:
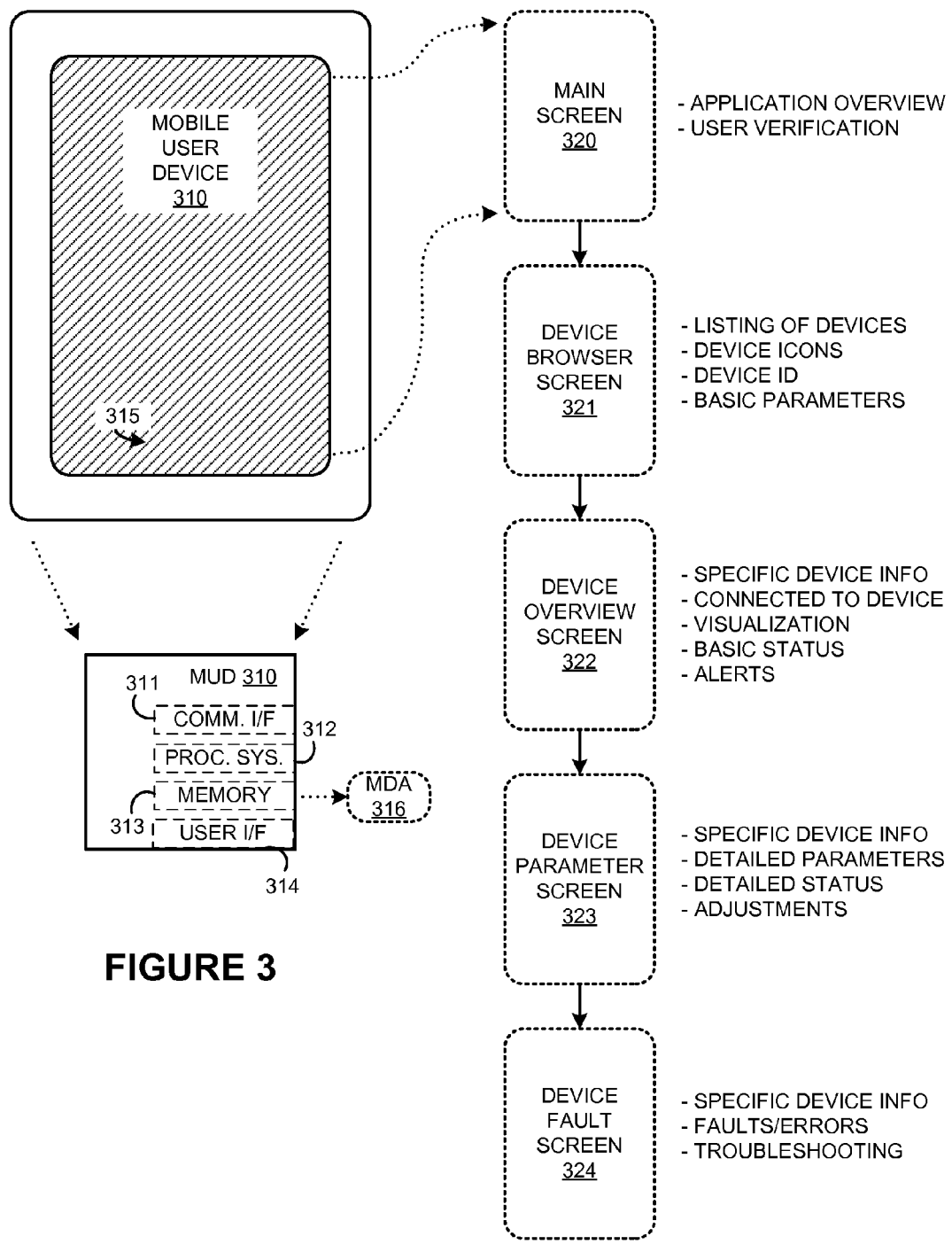
FIG. 3 is a block diagram illustrating a mobile user device.

FIG. 3 is a block diagram illustrating mobile user device 310. Mobile user device (MUD) 310 includes display 315 as a part of user interface 314, and executes mobile device application (MDA) 316 during operation. Display 315 can display information to a user of MUD 310, such as that detailed for MDA 316 below and screens 320-324 in FIG. 3.

A detailed view of MUD 310 is also illustrated in FIG. 3. MUD 310 includes communication interface 311, processing system 312, memory 313, and user interface 314. In operation, processing system 312 is operatively linked to communication interface 311, memory 313, and user interface 314. Processing system 312 is capable of executing software stored in memory 313. When executing the software, processing system 312 drives MUD 310 to operate as described herein.

Processing system 312 may be implemented within a single processing device but may also be distributed across multiple processing devices or sub-systems that cooperate in executing program instructions. Examples of processing system 312 include general purpose central processing units, microprocessors, application specific processors, and logic devices, as well as any other type of processing device.

Communication interface 311 may include communication connections and equipment that allows for communication over packet communication systems. Examples of communication interface 311 include transceivers, network interface cards, antennas, power amplifiers, RF circuitry, and other communication circuitry.

Memory 313 may comprise any storage media readable by processing system 312 and capable of storing software. Memory 313 may include volatile and nonvolatile, removable and non-removable media implemented in any method or technology for storage of information, such as computer readable instructions, data structures, program modules, mobile device applications, software products, or other data. Memory 313 may be implemented as a single storage device but may also be implemented across multiple storage devices or sub-systems. Memory 313 may comprise additional elements, such as a controller, capable of communicating with processing system 312. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 313 may comprise computer program instructions, firmware, or some other form of machine-readable processing instructions having processes that when executed by processing system 312 direct MUD 310 to operate as described herein. For example, software MDA 316 drives MUD 310 to obtain industrial device information corresponding to an industrial device in an automation environment and display the industrial device information on a display of MUD 310, among other operations. The software may be implemented as a single application or as multiple applications. In general, the software may, when loaded into processing system 312 and executed, transform processing system 312 from a general-purpose device into a special-purpose device customized as described herein.

User interface 314 may have input devices such as a keyboard, a mouse, a voice input device, or a touch input device, and comparable input devices. Output devices such as a display, speakers, printer, and other types of output devices may also be included with user interface 314. For example, in FIG. 3, user interface 314 includes display 315 for displaying screens 320-324 to a user of MUD 310. User interface 314 may also be considered to be an integration of MUD 310 with software elements, such as operating system and application software. For instance, a user may navigate an application view using a user device, such as a touchpad, or place a voice call using a keypad. The interface functionality provided by the integration of user interface software with user interface devices can be understood to be part of user interface 314.

In operation, MUD 310 executes MDA 316 as a customer deliverable software application that is intended to run on mobile platforms such as the iOS based (e.g. iPhone, iPod Touch, iPad), Android, or WebOS based devices, among others. One primary focus of MDA 316 and system is to assist customers in the setup, monitoring, troubleshooting and maintenance of industrial automation devices and Rockwell Automation products including E3 Overload, Smart Motor Controllers, and PowerFlex® drives, among others, and the software, machines, and machine systems associated with such industrial automation devices. One example of the MDA 316 and system includes the Mobile Device Explorer (MDE) application detailed in screens 320-324. The design of MDA 316 leverages object oriented and component architecture concepts to present a feature set beyond other industrial automation device related software applications that run on personal computer (PC) platforms. In addition, the graphical user interface (GUI) detailed in screens 320-324 is designed in a manner to be functionally consistent with PC based GUIs while at the same time exploiting the unique features of the mobile device platform.

Included in MDA 316 is the ability to provide industrial automation device support on a mobile device platform. Using mobile_operating systems, such as iOS, allows for development of the software application to deploy on a diverse set of device hardware providing significantly different footprint and GUI feature capabilities. Also included in MDA 316 is the ability to run a diagnostic utility that acquires current state or configuration information, faults, alarms, and other diagnostic data that can then be viewed in some other standard app on the platform, or can be emailed or transferred to other platforms.

Screens 320-324 detail an example graphical user interface and operation of MDA 316. Screen 320 is a main screen providing an application overview. For example, main screen 320 can include a main application initial screen, such as a main application initial screen for a Mobile Device Explorer mobile device application. The application overview can provide a list of possible actions a user can initially take once executing MDA 316, such as selecting among screens 321-324 or providing a user verification process.

The user verification process can include verifying or authenticating information such as a login/password, industrial access code, or allowing a user to select a preferred industrial site or factory location. In some examples, MUD 310 includes a geographic location determination system, such as a global positioning system (GPS) receiver, and a physical location of MUD 310 is verified prior to further operations of MDA 316 being allowed. This physical verification can authenticate a user or operator as being within the vicinity of a site, factory, automation environment, or other locations to prevent long-distance or malicious access to the intended industrial automation equipment. In yet further examples, MUD 310 has a physical proximity to the industrial device. When the proximity is less than a threshold distance, then a write or change access can be granted to the mobile device by a control system of industrial device. The proximity can be determined as discussed herein. Read access for the mobile device to read the configuration data from a control system of the industrial device can also be enabled according to proximity, or can always be enabled for the mobile device, whereas write access for the mobile device to write the configuration data to the control system can be limited according to proximity.

Screen 321 is a device browser screen, and shows a listing of all industrial devices available for configuration, monitoring, diagnostics, and maintenance by MDE, along with associated industrial device properties, such as network addresses, status, icon/pictures representing the devices, and descriptions. These devices can be listed in a tabular format with icons representative of the actual equipment to ease identification of specific device types. A device identifier, such a network address, as well as other basic summary parameters can be included to allow an operator to quickly view a large amount and variety of devices and glean basic information about such devices. The operator can then select a specific device via device browser screen 321 which activates device overview screen 322 for the specific device.

Device overview screen 322 includes a device diagram illustrating an overview screen which includes a specific industrial device for configuration, monitoring, diagnostics, and maintenance by MDE, along with associated industrial device properties, such as network addresses, status, icon/pictures representing the devices, and descriptions. Device overview screen 322 can provide a visualization of the specific device, and allows an operator to connect to the specific device for detailed configuration and information viewing. This information can include basic status information along with operational alerts, among other information. A listing of various parameters for the specific device can be listed and an operator can further change or view these various parameters by selecting a specific parameter to view.

By selecting the specific parameter, device parameter screen 323 would be presented to the operator.

Device parameter screen 323 shows a further detailed view of the industrial device selected in device browser screen 321 which includes a detailed view of a parameter or parameters for the industrial device. These detailed parameters or detailed status information can be modified by the operator via device parameter screen 323, such as making operational adjustments to the industrial device. These operational adjustments can include various states of the industrial device, such as speed, on/off, flow rate, among other various operational adjustments. Device parameter screen 323 can also include information related to any controller software, design and configurations, emulation, production management, batch, production, data management, historians, transaction, quality, compliance, change management, asset management, energy measuring, performance, visualization and visibility, and metrics software, all used in the context of the industrial automation and information environment.

Device fault screen 324 includes information on faults, errors, or other industrial device status for the industrial device selected in device browser screen 321. Device browser screen 321 can include indicators of various alerts, and an operator can select the specific alert or alerts to be shown device fault screen 324. Alternately, device fault screen 324 can be presented after selecting an alert or error indicator in device parameter screen 323.

MDA 316 can also include support for industrial device internal trend features, live data trending and charting, and data logging for short time periods. Different graphical views can be presented to the user of MDA 316, such as a Functional View, Deployment View, Operational View, Concurrency View, or Information View, among others. The different graphical views can include meters, bar graphs, tables, status, process displays, among other graphical display and information presentation elements.

MDA 316 can also include customer-specific data features, such as the ability to take a picture, using the mobile device, of the industrial device to be interacted with, and use that picture instead of a default image or icon in the application. The photo may also be used to provide visual association between the contents of the mobile application and a physical device. Also, MDA 316 can include an ability to add notes to the device information, which can be stored on a mobile device and transported to a PC-based application, cloud storage system, or transferred via a messaging service to technical personnel. MDA 316 can also include the ability to upload/download a file (e.g. HIM (human interface module) copycat) for a specific device, as well as the ability to transfer an upload/download file from the mobile device to a PC running an application such as a configuration based software tool. This allows the customer to have maintenance personnel upload/download configurations from their mobile device and then sync with application/system level development tools.

MDA 316 or other applications for configuration, monitoring, diagnostics, and maintenance of machine systems or industrial devices can be included in an online application store, such as an App Store or App market, or can be distributed ad-hoc. Users can be authorized to download and install the applications based on purchased machine systems or industrial devices, and can have licensing limited to a particularly registered mobile device. For example, when a particular machine system is purchased, then the user can be authorized to download and activate the application onto a mobile device for only that particular machine system.

Additionally, a specific mobile device, such as via an identifier associated with MDA 316 application, can be enabled to control or configure a specific machine system or industrial device. The number of mobile devices allowed to communicate with a particular industrial device can also be limited, possibly to a number of devices less than normally allowed for an App Store-style distribution.

In further examples, a machine system or industrial device can be configured at a first location, such as at a manufacturing location, with the configuration information stored as data files and transferred to an Internet-based storage system. The Internet-based storage system can include a server, data center, or cloud system. When the machine system or industrial device is installed at a second location, such as a customer site, the configuration data files can be transferred from the Internet-based storage system to a mobile device. The mobile device can then be used to configure the machine system or industrial device with the configuration data files over a short-distance wired or wireless link at the installation location of the machine system or industrial device. Furthermore, the mobile device can use the configuration data files downloaded from the Internet-based storage system to verify pre-configured machine systems or industrial devices to ensure the as-installed configurations match those uploaded during manufacturing and as transferred to the Internet-based storage system. It should be understood that the mobile device itself can include a computer-readable storage medium for storing the configuration data thereon.

The configuration data of a machine system or industrial device can be tailored during operation by a user or operator of the machine system or industrial device. The configuration data can then be transferred to a mobile device in close proximity to the machine system or industrial device. The configuration data as stored on the mobile device can then be browsed, altered, and transferred. The configuration data as stored on the mobile device can also be transferred back to the original machine system or industrial device to alter the configuration data thereon, or can be transferred to an archival storage system, such as a cloud storage system for backup and later retrieval. In further examples, such as in malfunctioning equipment, the mobile device can retrieve the configuration data from the malfunctioning equipment for analysis and review on the mobile device. Changes can be made to the configuration data on the mobile device, and transferred back to the malfunctioning equipment. The configuration data retrieved from the malfunctioning equipment can also be exchanged via the mobile device to an off-site service center or manufacturing center for further analysis and repair.

In further examples, the machine systems or industrial devices can transfer alerts to the mobile device via a wireless or cellular network, such as using text messages or voice calls to indicate a malfunction on a specific machine system. The mobile device can then browse to the malfunctioning machine system using the application to identify the machine system. Configuration data of the malfunctioning system can then be transferred by the machine system to the mobile device over the cellular network or other wireless link for inspection, analysis, and repair. The repaired configuration data can then be transferred back to the machine system from the mobile device, possibly restricted by proximity of the mobile device to the machine system as described herein.

Control or configuration access can be inhibited from the mobile device or from other devices when the mobile device is not located in the proximity of the machine system or industrial device. For example, a user may wish to configure or control a machine system from the mobile device, but would be prevented from doing so unless nearby the actual machine system, such as in an on-site maintenance scenario. A proximity authentication process can be performed on a mobile device seeking to control the machine system, where the proximity authentication relies upon a short-range wireless interface connecting and establishing the proximate location via proximity authorization elements of the machine system or building environment. The proximity authorization can prevent unauthorized or remote tampering with the machine systems, or to limit write-access to configuration data of a machine system to only mobile devices within a certain distance. The certain distance can be based on if the mobile device and the machine system can establish a direct wireless connection. Since many forms of wireless links cannot be established over a large distance, connectivity ensures proximate distance. The proximity of the mobile device to the machine system can be determined by a short-range wireless connection, such as when Bluetooth, RFID, ZigBee, or Wi-Fi connectivity is possible. Other location determination methods can be employed, such as wireless signal triangulation, global positioning system (GPS) positioning, inertial positioning, or accelerometer-based positioning. The machine systems can also include location determination systems to enable calculating a distance from the mobile device to the machine system. A database of geographical coordinates can also be referenced to determine proximity of the mobile device to a machine system, where the database includes coordinates of a variety of machine systems.

In addition to, or alternately from, the proximity authorization, other considerations can be employed to control write access or enforce change prevention for configuration transfer from a mobile device to a machine system. For example, the mobile device can include a battery or other portable power source. The remaining power of the battery can be taken into account when update a configuration of a machine system, such as preventing an update or restricting write access when the battery life is too low to successfully complete a configuration update. For example, when the remaining power of the battery falls below a power threshold to successfully complete a configuration update, changes can be inhibited. The motion of the mobile device can also be considered, such as when the mobile device communicates over a cellular link which can experience dropped communication sessions more frequently, especially during handoffs. If the mobile device would be more likely to experience an interruption in communication due to motion of the mobile device, then the update can be prevented. Furthermore, if the mobile device incorporates a voice call system, such as when the mobile device comprises a phone or smartphone, the voice call system can be disabled during a configuration transfer to a machine system. Thus, incoming voice calls or text messages would be inhibited from interrupting a configuration transfer to a machine system from the mobile device. In a further example, if the mobile device includes accelerometer circuitry, an acceleration of the mobile device can be processed during a configuration update to the machine system. If an abrupt or extreme acceleration is experienced, such as when a mobile device is dropped, then the configuration update can be canceled, stalled, or otherwise safely provisioned to complete in case of a mobile device malfunction due to droppage or impact.

The mobile device can interface with a microcontroller system associated with the machine system or industrial device. For example, a microcontroller, microprocessor, programmable logic device, or programmable logic controller can be integrated into the machine system or machine drive controller, such as in the Rockwell Automation PowerFlex® power drive systems. The microcontroller system can include networking capability, such as Internet Protocol communication functionality, Ethernet interfaces, wireless interfaces, or other networking interfaces. In some examples, the machine system is connected over a network interface to a local-area network or wide-area network for communication with other devices, such as a mobile device. The mobile device can communicate wirelessly with the machine system over the network connection. In a further example, the microcontroller system is configured to communicate over the Internet with a mobile device.

Figure 4:
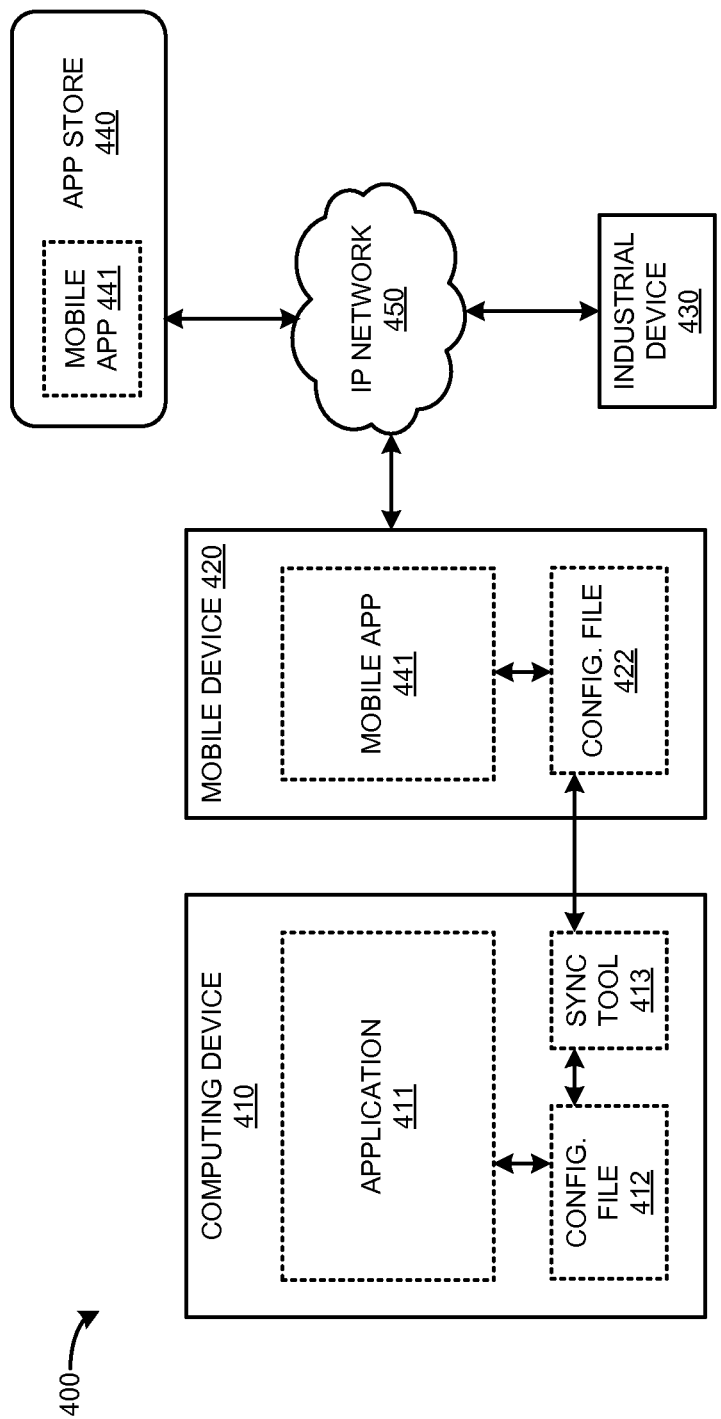
FIG. 4 is a system diagram illustrating a configuration import/export system.

FIG. 4 is a system diagram illustrating import/export system 400 including application 411 and mobile app 441 as further examples of MDA 316, although application 411 and mobile app 441 can use other configurations. A user can create device configuration files 412 on the computing device 410 via application 411, 'drag' them onto mobile device 420 and then invoke mobile app 441 to consume configuration files 422. A user can copy configuration files 422 from mobile device 420 back to the PC to be imported by application 411. A specialized sync tool 413 can be employed on both computing device 410 and mobile device 420 to allow a user to select configuration files on computing device 410 for transfer and synchronization to mobile device 420, and vice versa. In further examples, a user can import configuration files 412 or 422 from an online source while using application 411 or mobile app 441. Configuration files 422 can be used to modify a configuration of industrial device 430, and mobile device 420 can update configuration files 422 with configuration information obtained from industrial device 430. Configuration files 422 can then be transferred by sync tool 413 to computing device 410 for use by application 411.

In this example, mobile device 420 communicates with industrial device 430 over IP network 450. It should be understood that IP network could instead include a first packet network for mobile device 420 to communicate with industrial device 430 and a second packet network for mobile device 420 to communicate with app store 440.

As shown in FIG. 4, mobile device 420 is configured to communicate over IP network 450 via an IP link. In this example, application 441 is a mobile device application installed on mobile device 420. Initially, mobile device 420 downloads application 441 from app store 440, and app store 440 transfers application 441 over IP network 450 for delivery to mobile device 420. Mobile device 420 could select application 441 for download from within another application or web page executed on mobile device 420, such as an app store or app market. In some examples, mobile device 420 or app store 440 requires a user to purchase application 441 prior to download of application 441, which may include an authorization or verification process as discussed herein to verify the user of mobile device 420 as a previous purchaser of the associated industrial device.

In this example, app store 440 is a mobile application store to provide mobile applications for interaction with industrial automation environments. App store 440 can include one or more computer readable media having stored thereon at least one mobile application available for download by a mobile computing device over a communication network. In FIG. 4, app store 440 includes mobile app 441 which can be downloaded from app store 440 by mobile device 420 over IP network 450. Mobile app 441 typically includes program instructions that, when executed by mobile device 420, direct mobile device 420 to obtain industrial device information corresponding to an industrial device, such as industrial device 430, within an industrial automation environment and display the industrial device information on a display of mobile device 420. Mobile app 441 can be downloaded by mobile device 420 and stored on a computer-readable medium on mobile device 420. App store 440 could also include a server system configured to receive a request initiated by mobile device 420 to obtain mobile app 441 and responsively transfer mobile app 441 to mobile device 420.

In typical examples, mobile app 441 is a specialized mobile software application developed for execution on mobile devices in contrast to general purpose computing devices such as PCs. Mobile software application development includes developing software for small low-power handheld devices such as mobile phones, cell phones, smart phones, pad computing devices, personal digital assistants, or tablet computers, among other devices. Depending upon the specific platform or hardware comprising the mobile device, various software development tools can be employed to create and deploy mobile software applications. These specialized development tools can include software development kits (SDK) for mobile device platforms, such as iOS SDK, Android SDK, Adobe AIR, Javascript, Java, Adobe Flash, or other development tools, including combinations thereof.

Figure 5:
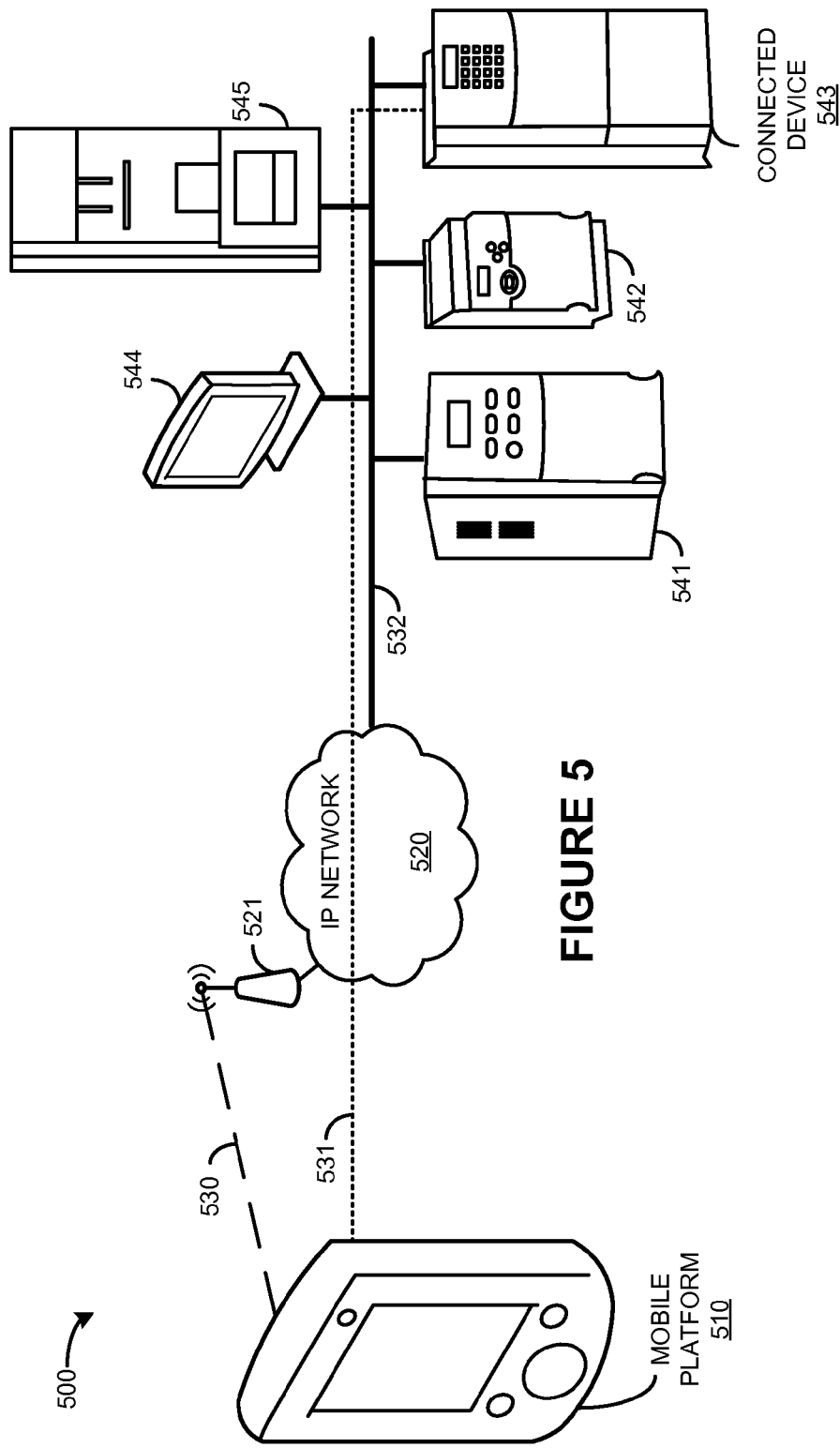
FIG. 5 is a system diagram illustrating an industrial automation environment.

FIG. 5 illustrates an example industrial automation environment 500 for mobile platform 510 to interact with machine systems or industrial devices. Mobile platform 510 is running an application, such as MDA 316, where the application allows a user to browse a list of available industrial devices from among device 541-545. The user selects a first industrial device, namely device 545, and the application allows mobile platform 510 to connect via IP link 531 to the selected industrial device, noted as "connected device 543" in FIG. 5. As shown in FIG. 5, mobile platform 510 communicates over wireless link 530, through IP network 520, and over Ethernet link 532 to form IP link 531. IP network 520 includes wireless router 521 for providing wireless link 530. IP network 520 can also include the Internet, a cellular voice and data network, Ethernet networks, wireless networks, or industrial data networks, including combinations thereof. Several industrial devices 541-545 are configured to communicate over Ethernet network 532 in FIG. 5, as shown by the pictorial representations.

The connected device 543 in this example is a Rockwell Automation PowerFlex® drive, and can be employed to control a motor, pump mechanism, or other industrial devices. It should be understood that the industrial devices are merely exemplary in FIG. 5, and the industrial devices can be any industrial automation and information product or machine, such as those discussed herein. In FIG. 5, mobile platform 510 can retrieve configuration information from the connected device, over the associated IP link 531. The configuration information can be displayed on mobile platform 510. Additionally, mobile platform 510 can modify, change, or write the configuration information back to connected device 543, so as to affect the operation of connected device 543. The configuration data can be streamed to mobile platform 510, so as to present live data acquired directly from the selected industrial device, such as for monitoring real-time data or enacting real-time configuration changes to the operation of connected device 543.

FIG. 6 is a block diagram illustrating mobile device 600, as an example of the mobile devices discussed herein, although other configurations can be employed. Mobile device 600 includes, wireless transceiver portion 610, wired transceiver portion 615, processing system 620, user interface 640, and power system 650. Wireless transceiver portion 610, wired transceiver portion 615, processing system 620, user interface 640, and power system 650 are shown to communicate over a common bus 660 for illustrative purposes. It should be understood that discrete links can be employed, such as data links, power links, RF links, or other links. Mobile device 600 may be distributed or consolidated among equipment or circuitry that together forms the elements of mobile device 600.

Wireless transceiver portion 610 comprises an antenna element and communication interface circuitry for communicating with wireless access nodes of a wireless communication network, such as with base stations of a cellular voice and data network. Wireless transceiver portion 610 can include transceiver equipment and antenna elements for wirelessly exchanging user communications and overhead communications over the associated wireless link 661. Wireless transceiver portion 610 also receives command and control information and instructions from processing system 620 or user interface 640 for controlling the operations of wireless communications over wireless link 661. Wireless link 661 may use various protocols, such as Code Division Multiple Access (CDMA), Evolution-Data Optimized (EVDO), single-carrier radio transmission technology link (1×RTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), ZigBee, or some other wireless communication format, including combinations, improvements, or variations thereof. Although one main wireless link 661 is shown in FIG. 6, it should be understood that wireless link 661 is merely illustrative to show a communication mode or wireless access pathway for mobile device 600. In other examples, further wireless links can be included.

Wired transceiver portion 615 comprises transceiver circuitry and communication interface circuitry for communicating over wired links. Wired transceiver portion 615 also receives command and control information and instructions from processing system 620 or user interface 640 for controlling the operations of wireless communications over wireless link 662. Wireless link 662 uses metal, glass, optical, air, space, or some other material as the transport media. Wireless link 662 can use various communication protocols, such as Internet Protocol (IP), Ethernet, circuit-switched, communication signaling, serial communications, Universal Serial Bus (USB), controller-area network (CAN), Inter-Integrated Circuit (I2C), or some other communication format, including combinations, improvements, or variations thereof. Wireless link 662 can be a direct link or may include intermediate networks, systems, or devices. Although one main wired link 662 is shown in FIG. 6, it should be understood that link 662 is merely illustrative to show a communication mode or access pathway for mobile device 600. In other examples, further wired links can be included.

Processing system 620 includes storage system 621. Processing system 620 retrieves and executes software 630 from storage system 621. In some examples, processing system 620 is located within the same equipment in which wireless transceiver portion 610, wired transceiver portion 615, user interface 640, or power system 650 are located. In further examples, processing system 620 comprises specialized circuitry, and software 630 or storage system 621 can be included in the specialized circuitry to operate processing system 620 as described herein. Storage system 621 can include a non-transitory computer-readable medium such as a disk, tape, integrated circuit, server, flash memory, phase change memory, magnetic memory, optical memory, or some other memory device, and also may be distributed among multiple memory devices.

Software 630 may include applications, an operating system, logs, utilities, drivers, networking software, tables, databases, data structures, and other software typically loaded onto a computer system. Software 630 can contain user application programs, server software, firmware, or some other form of computer-readable processing instructions. When executed by processing system 620, software 630 directs processing system 620 to operate as described herein, such as receive configuration information for machine systems, and display the configuration to a user of mobile device 600, among other operations.

In this example, software 630 includes configuration retrieval module 631 and configuration display module 632. It should be understood that a different configuration can be employed, and individual modules of software 630 can be included in different equipment in mobile device 600. In typical examples, software 630 is executed natively on mobile device 600 by processing system 620, and software 630 is executed as a native application. In other configurations, software 630 is executed via emulation, virtualization, via non-native program instructions or code via a web page or web interface, among other execution configurations. Configuration retrieval module 631 interfaces with machine systems or with databases storing machine system information to retrieve configuration information for the machine systems. Configuration retrieval module 631 may include functionality to check proximity of mobile device 600 to a machine system, such as using available connectivity of a wireless interface of mobile device 600 to determine proximity. Configuration retrieval module 631 may also retrieve configuration information from multiple machine systems, and transfer the configuration to configuration display module 632. Configuration display module 632 displays the configuration information to a user of mobile device 600. Configuration display module 632 may display multiple configurations of multiple machine systems in a graphical summary format, such as tables or lists, and display detailed information for a selected machine system. In further examples, configuration display module 632 can allow a user of mobile device 600 to alter or modify the configuration information and transfer the modified configuration information to configuration retrieval module 631 for transfer to a machine system or database.

User interface 640 includes equipment and circuitry for receiving user input and control, such as for retrieving configuration information and modifying configuration information, or engaging in voice calls or data sessions, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 640 also includes equipment to communicate information to a user of mobile device 600, such as configuration information of machine systems. Examples of the equipment to communicate information to the user can include displays, indicator lights, lamps, light-emitting diodes, haptic feedback devices, audible signal transducers, speakers, buzzers, alarms, vibration devices, or other indicator equipment, including combinations thereof.

Power system 650 includes circuitry and a power source to provide power to the elements of mobile device 600. The power source can include a battery, solar cell, spring, flywheel, capacitor, thermoelectric generator, chemical power source, dynamo, or other power source. In some examples, power system 650 receives power from an external source, such as a wall outlet. Power system 650 also includes circuitry to condition, monitor, and distribute electrical power to the elements of mobile device 600.

Bus 660 comprises a physical, logical, or virtual communication link, capable of communicating data, control signals, and communications, along with other information. In this example, bus 660 also includes RF and power distribution elements, such as wires, circuit board traces, or other elements. In some examples, bus 660 is encapsulated within the elements of wireless transceiver portion 610, wired transceiver portion 615, processing system 620, user interface 640, or power system 650, and may be a software or logical link. In other examples, bus 660 uses various communication media, such as air, space, metal, optical fiber, or some other signal propagation path, including combinations thereof. Bus 660 can be a direct link or might include various equipment, intermediate components, systems, and networks.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A mobile application comprising program instructions stored on a non-transitory memory of the mobile device and executable by a processing system of the mobile device that, when executed by the processing system of the mobile device, direct the mobile device to:
   retrieve and execute the program instructions from the non-transitory memory of the mobile device, wherein the mobile application was downloaded prior to execution from a mobile application store into the non-transitory memory of the mobile device;
   authenticate the mobile device as being within the vicinity of the industrial device by at least identifying a physical proximity of the mobile device with respect to the industrial device;
   establish a communication link with an industrial device within an automation environment, wherein the communication link comprises a direct connection between the industrial device and the mobile device;
   obtain industrial device information corresponding to the industrial device;
   process the industrial device information to generate a graphical view of the industrial device information;
   display the graphical view of the industrial device information on a display of the mobile device;
   identify a remaining power of a battery of the mobile device;

grant change access to control operational adjustments to the industrial device when the physical proximity is less than a threshold distance if the remaining power is above a power threshold to successfully complete a change to the operational adjustments; and inhibit change access to control the operational adjustments to the industrial device if the remaining power of the battery falls below the power threshold.

2. The mobile application of claim 1, wherein the program instructions, when executed by the processing system of the mobile device, allow a user of the mobile device to:

update the industrial device information so as to modify operation of the industrial device to control the operational adjustments to the industrial device.

3. The mobile application of claim 1, wherein the program instructions, when executed by the processing system of the mobile device, direct the mobile device to:

receive an alert from the industrial device, the alert indicating a malfunction of the industrial device; and display the alert to a user.

4. The mobile application of claim 1, wherein the industrial device information is at least one of configuration information, monitoring information, diagnostics information, control information, performance information, energy usage information, design and configuration, emulation, production management, batch, production, data management, historian, transaction, quality, compliance, change management, asset management, energy measurement, performance, visualization and visibility, metrics, and maintenance information.

5. The mobile application of claim 1, wherein the program instructions, when executed by the processing system of the mobile device, direct the mobile device to:

obtain the industrial device information from the industrial device.

6. The mobile application of claim 1, wherein the mobile application is executed natively in a mobile operating system executed by the processing system on the mobile device, the mobile operating system comprising at least one of an Android operating system and an iOS operating system.

7. A method of operating a mobile device, the method comprising:

communicating with an industrial device within an automation environment via a direct connection between the industrial device and the mobile device;

obtaining industrial device information from the industrial device and corresponding to the industrial device;

displaying the industrial device information on a display of the mobile device;

authenticating the mobile device as being within the vicinity of the industrial device by at least identifying a physical proximity of the mobile device with respect to the industrial device;

identifying a remaining power of a battery of the mobile device;

granting change access to control operational adjustments to the industrial device when the physical proximity is less than a threshold distance if the remaining power is above a power threshold to successfully complete a change to the operational adjustments; and inhibit change access to control the operational adjustments to the industrial device if the remaining power of the battery falls below the power threshold.

8. The method of claim 7, further comprising:

updating the industrial device information so as to modify operation of the industrial device to control the operational adjustments to the industrial device.

9. The method of claim 7, further comprising:

identifying the physical proximity of the mobile device with respect to the industrial device based on establishing the direct connection between the industrial device and the mobile device.

10. The method of claim 7, wherein the industrial device information is at least one of configuration information, monitoring information, diagnostics information, control information, performance information, energy usage information, design and configuration, emulation, production management, batch, production, data management, historian, transaction, quality, compliance, change management, asset management, energy measurement, performance, visualization and visibility, metrics, and maintenance information.

* * * * *